United States Patent
Sorensen (10) Patent No.: US 8,256,712 B2
(45) Date of Patent: Sep. 4, 2012

(54) OVERHEAD REST MODULE

(75) Inventor: Shawn H. Sorensen, Everett, WA (US)

(73) Assignee: The Boeing Company, Chicago, IL (US)

( * ) Notice: Subject to any disclaimer, the term of this patent is extended or adjusted under 35 U.S.C. 154(b) by 638 days.

(21) Appl. No.: 12/233,374

(22) Filed: Sep. 18, 2008

(65) Prior Publication Data

US 2010/0065682 A1    Mar. 18, 2010

(51) Int. Cl.
*B64D 11/00* (2006.01)

(52) U.S. Cl. ............ 244/118.5; 244/118.6; 105/314; 105/315; 105/316; 114/189; 296/190.02

(58) Field of Classification Search ........... 244/118.5, 244/118.6; 105/314, 315, 316; 114/189; 296/190.02
See application file for complete search history.

(56) References Cited

U.S. PATENT DOCUMENTS

| | | | |
|---|---|---|---|
| 4,858,258 A * | 8/1989 | Mizelle | 5/12.1 |
| 6,182,926 B1 | 2/2001 | Moore | |
| 6,463,651 B1 * | 10/2002 | Koeneker et al. | 29/513 |
| 6,464,169 B1 | 10/2002 | Johnson et al. | |
| 6,848,654 B1 * | 2/2005 | Mills et al. | 244/118.5 |
| 6,854,143 B2 * | 2/2005 | Sharples | 5/724 |
| 7,083,145 B2 | 8/2006 | Mills | |
| 7,232,095 B2 * | 6/2007 | Park et al. | 244/118.6 |
| 2006/0054742 A1 | 3/2006 | Druckman et al. | |

OTHER PUBLICATIONS

Druckman, Ralph D., "Alternate & Overhead Space Utilization in Long-Range Commercial Aircraft," Presented at 67th Annual Conference of Society of Allied Weight Engineers, Inc., Seattle, WA, May 17-21, 2008.

* cited by examiner

Primary Examiner — J. Woodrow Eldred
(74) Attorney, Agent, or Firm — Ostrager Chong Flaherty & Broitman P.C.

(57) ABSTRACT

A crew rest unit for an aircraft fuselage may be formed as a monocoque shell (10) having curved walls (10b) complementary to and fitting within an available space (20a, 20b) in the aircraft fuselage. The monocoque shell (10) provides an enclosure for at least one sleep area (14a, 14b) therein. The curved walls (10b) of the monocoque shell (10) have load-bearing mounting members (12) on their outer surfaces for attachment of fasteners (22) to an adjacent wall or frame for the pre-determined available space (20a, 20b) in the aircraft fuselage.

16 Claims, 7 Drawing Sheets

OVERHEAD REST MODULE

TECHNICAL FIELD

The disclosure generally relates to a rest module for use in an aircraft, and particularly to one that is installed in the overhead crown volume of the aircraft using lightweight structures and components.

BACKGROUND

Efficient space utilization using lightweight structures is very important for operators of aircrafts seeking to maximize revenue, especially with rising costs for aircraft fuel and increased emphases on fuel use efficiency. Besides optimization of the passenger cabin and luggage handling requirements, stowage and rest space for flight and cabin crew must also be provided with minimal impact to passenger cabin floor area (and seat count) while avoiding loss of revenue belly cargo capacity. As use of longer-range passenger aircrafts on routes with flight durations requiring rest periods for flight crew and cabin attendants increases over time, the need for providing dedicated rest facilities and space for other main cabin passenger service functions has become much more important.

A promising area for efficient space utilization is the overhead space in twin-aisle aircraft for pilot and attendant crew rest units. Long range flights may require a replacement crew as mandated by FAA regulations. The replaced crew is required to be off duty ('at rest') a specified number of hours between shifts, so an arrangement must be made to facilitate this requirement. This may be done by providing a rest/sleep area reserved especially for the use of the crew. Such areas have been previously used above, below and on the main deck. In order to use as much of the area in an aircraft to generate revenue, airlines prefer to dedicate the area below the main deck to transport cargo and the main deck for fare paying passengers. This leaves the area above the main deck as a good and practicable location for the crew to rest.

As there is only a discrete amount of space above the passenger cabin where a crew rest can be placed, this area must be maximized for the comfort of the crew while still allowing necessary systems passageway through the aircraft. Fitting a structure in this area may be somewhat cumbersome and may lead to less than optimal weight-efficient designs. Current overhead crew rests may consist of many flat and curved panels fastened and bracketed together to create a structure for two or more flight crew to rest and sleep. The sleeping quarter structure typically has a rectangular footprint with square edges going up to a curved ceiling that follows the curvature of the fuselage crown. The existing designs may be non-optimized with regards to space utilization, overall weight performance, manufacturability, etc., and may require manual assembly of many pieces to fabricate the structure. The typical assembly requires the use of a large quantity of fasteners and metallic brackets, which may cause the crew rests to be particularly heavy for the function that they perform. This extra weight may require being supported with strong (and heavy) fittings. All of these details add to the overall weight of the aircraft. The more weight that is added to the aircraft, the less efficient the aircraft.

Accordingly, there is a need for an efficient solution for overhead space utilization that uses fewer panel structures and fasteners and is suitably configured to better utilize and conform to the available space in the fuselage crown area.

SUMMARY

In accordance with an embodiment of the present disclosure, a crew rest unit comprises a monocoque shell having a curved shape complementary to and fitting within a predetermined available space in an aircraft cabin, said monocoque shell providing an enclosure for at least one sleep area therein, as well as a load-bearing structure for installation of the crew rest unit in the available space of the aircraft. Preferably, the monocoque shell has a floor portion that is adapted to suspend substantially horizontally one or more tension-supported sleep systems over a space provided below the tension-supported sleep systems. The frame for the tension-supported sleep system can also have a pivotable section to allow access to the space there under for the crew to stow their gear and other objects.

In the preferred embodiment, the monocoque body performs dual functions of supporting the sleep enclosure and providing the load-bearing structure for installing it within the aircraft. The monocoque body may be formed with a curved shape complementary to a crown volume space of the aircraft available for overhead space utilization. This eliminates much of the typical bulkiness and weight of fasteners, brackets, and fittings used to fasten and support the panels of the conventional sleep enclosure. The tension-supported sleep systems obviate the need for heavy and bulky mattresses to be supported on assembled floor panels. Instead of a thick heavy mattress on top of a flat inflexible panel, the sleeping surface is a tension supported mesh fabric or netting, under which gear and other objects may be stored. The improved crew rest module can be fabricated with much less weight, installed much easier and quicker, and utilizes the available space in the crown volume of the aircraft much more efficiently. The result is a crew rest that utilizes less brackets, fasteners and potted inserts. Panel surface area and weight are also significantly decreased. The monocoque body eliminates the need for many of the typical machined aluminum brackets for installing enclosure panels.

Other objects, features, and advantages of the preferred embodiments will be explained in the following detailed description with reference to the appended drawings.

DETAILED DESCRIPTION

In the following detailed description, certain preferred embodiments are described as illustrations in a specific application environment in order to provide a thorough understanding of the present disclosure. Those methods, procedures, components, or functions which are commonly known to persons of ordinary skill in the field of the invention are not described in detail so as not to unnecessarily obscure a concise description of the present disclosure. Certain specific embodiments or examples are given for purposes of illustration only, and it will be recognized by one skilled in the art that the present invention may be practiced in other analogous applications or environments and/or with other analogous or equivalent variations of the illustrative embodiments.

Figure 1:
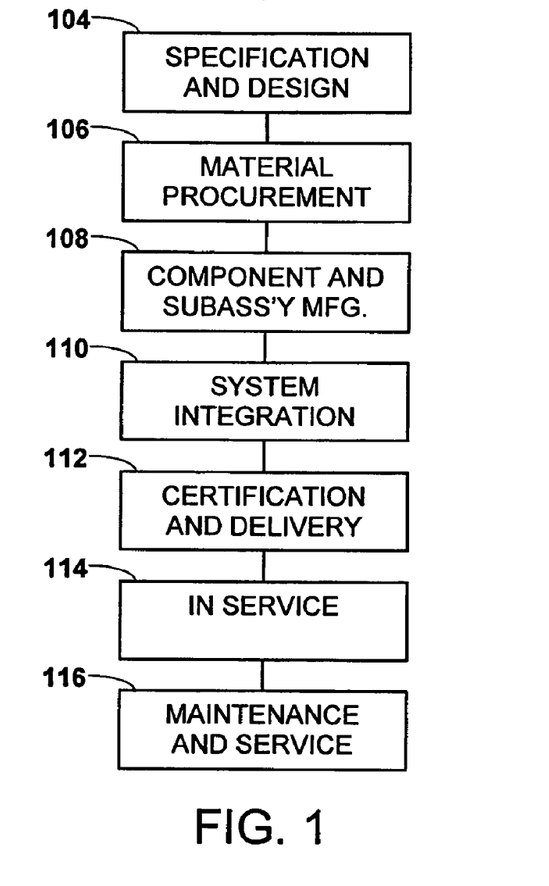
FIG. 1 is a flow diagram of aircraft production and service methodology.
Figure 2:
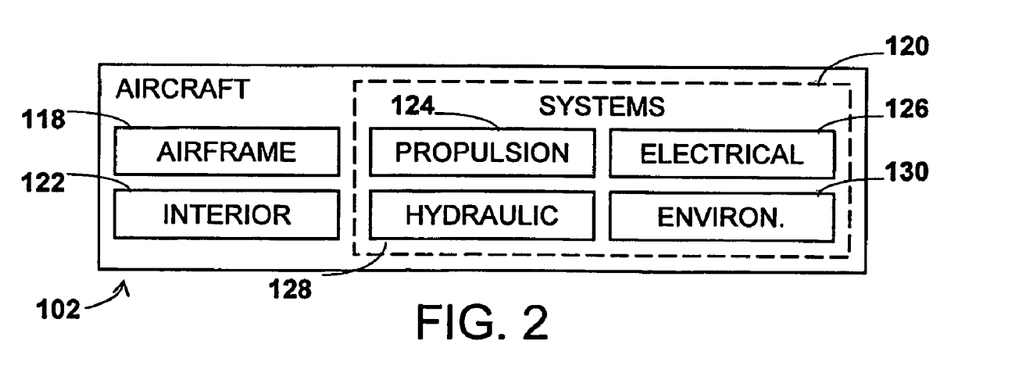
FIG. 2 is a block diagram of main components of an aircraft.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles in this disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
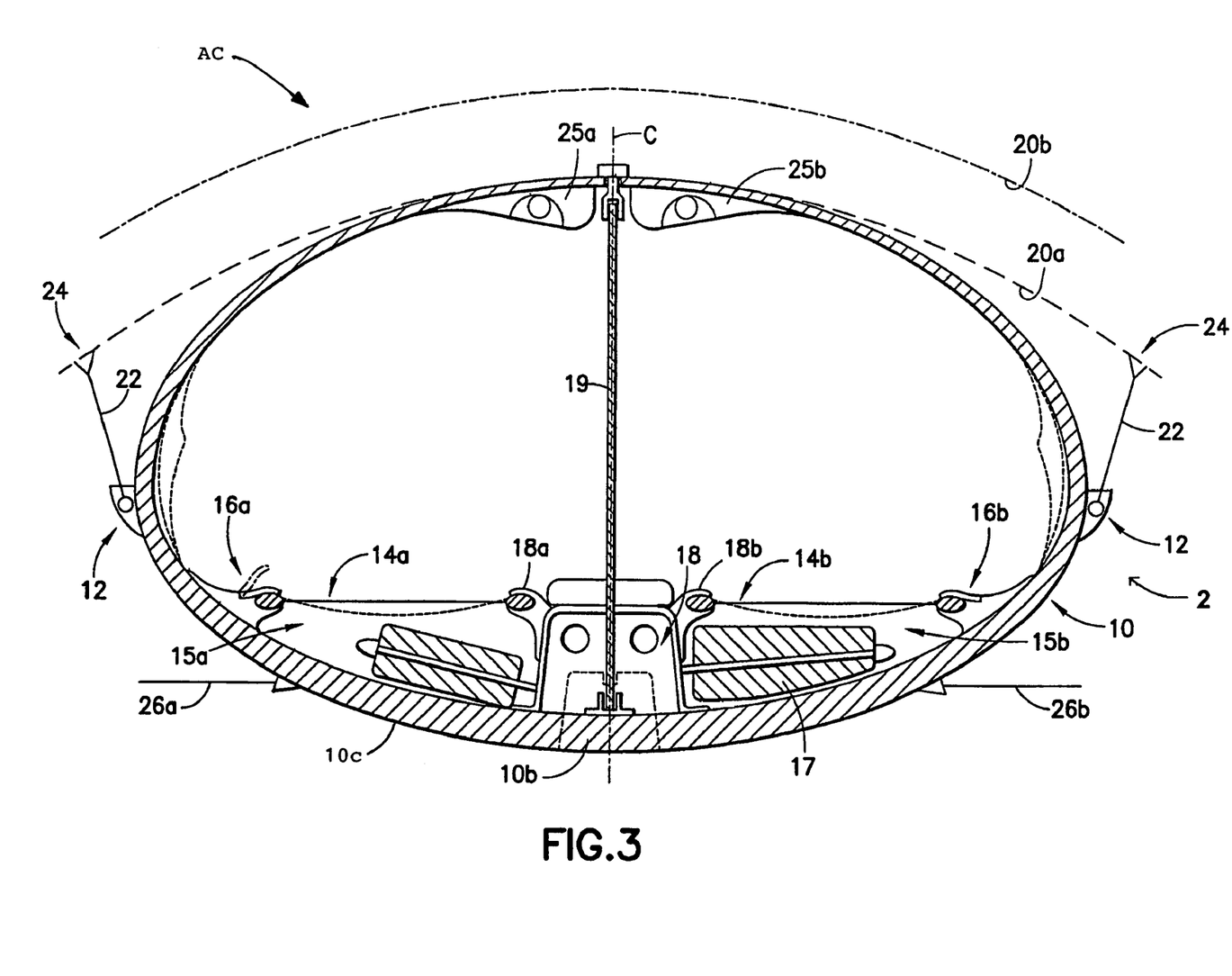
FIG. 3 is a schematic diagram of a crew rest unit formed as a monocoque shell for efficient utilization of overhead space in an aircraft.
Figure 7:
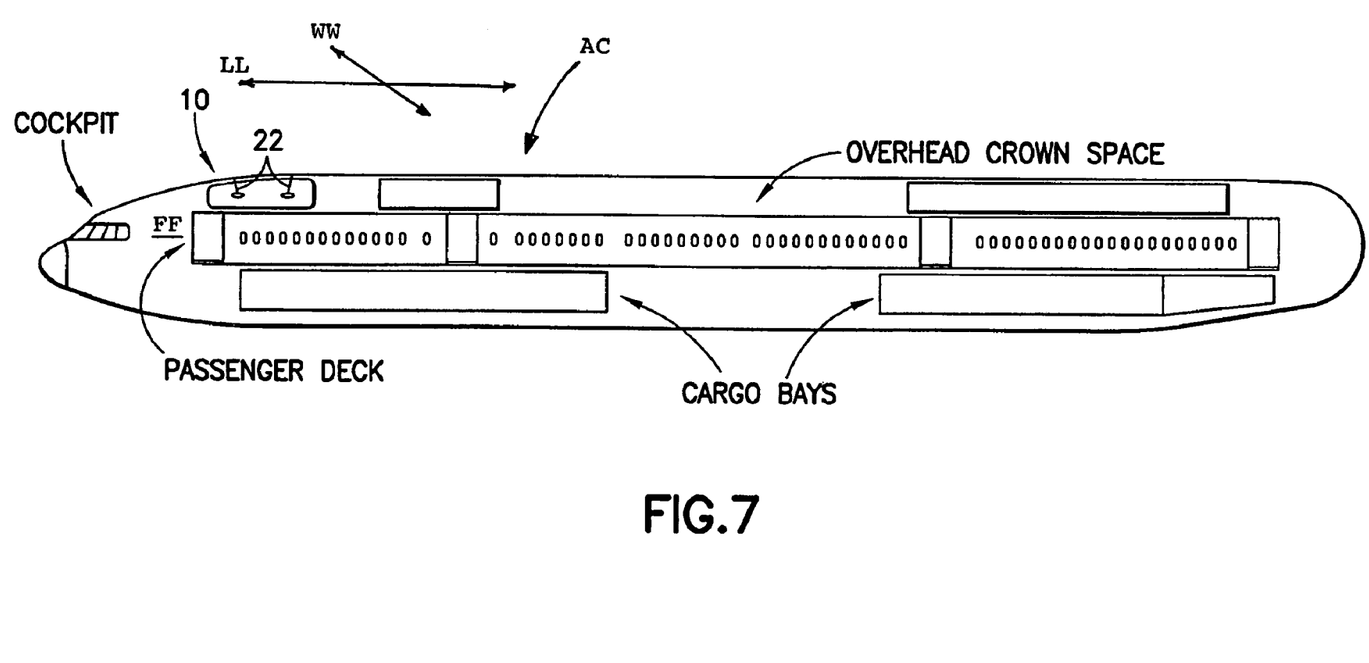
FIG. 7 is a schematic view showing the monocoque shell of the crew rest unit installed in the crown space of the fuselage of an aircraft.

Referring to FIG. 3, an embodiment of a rest module 2 for the flight crew of an aircraft in accordance with the present disclosure is formed as a monocoque shell 10 with curved walls 10*b* complementary to and fitting within an overhead crown volume space adjacent the cockpit at a forward part of an aircraft AC (see also FIG. 7). In the figure, the dashed line referenced by numeral 20*a* indicates the aircraft skin or interior wall structure at a more forward position of the crown volume (toward the cockpit), whereas the dotted-and-dashed line 20*b* indicates the aircraft skin or interior wall structure at a more rearward position which has a greater height due to the tapering shape of the aircraft toward its forward end. The monocoque shell (10) is shown installed in the crown volume space (20*a*, 20*b*) with tie-rods 22 attached between mounting members 12 fixed to the outer surface 10*c* of the curved walls 10*b* of the monocoque shell 10 and an adjacent wall (20*a*, 20*b*) or frame of the aircraft in the crown volume space. Alternatively, the space between fuselage frames and between the internal structure and/or the internal flanges and the external skin of the aircraft may be incorporated into the space available for use with the monocoque shell 10.

"Monocoque" is a construction technique that supports a structural load using the object's external skin. This stands in contrast with using an internal framework (or truss) that is then covered with a non-load-bearing skin. The monocoque shell is fabricated and designed to have significant structural properties. The use of composite materials has led to advances in monocoque construction. By layering the composite materials in certain ways, the structure can have high strength and stiffness in an orientation needed to convey higher loads while the structure can have lower strength and stiffness in an orientation needed to convey lower loads. The monocoque shell can also be built to be flexible in useful ways, and no heavier or stiffer than needed at any point.

The monocoque shell may be installed and fastened in the crown volume space by fasteners attached between load-bearing mounting members 12 on the outer surfaces 10*c* of the curved walls 10*b* and the adjacent aircraft interior wall or frame. In this embodiment, the fasteners may be in the form of tie rods 22 attached between an anchor element 24 attached to the aircraft skin, frames and/or internal support structure or interior wall 20*a*, 20*b* and the mounting members 12 attached to the outer surface of the curved walls 10*b* of the monocoque shell 10. The curved walls 10*b* of the monocoque shell 10 define an enclosure that can accommodate crew rest or sleep areas therein. In this embodiment, two tension-supported sleep systems 14*a*, 14*b* are shown arranged side-by-side symmetrically in the enclosure on respective sides of a vertical centerline C of the shell 10. Each sleep system 14*a*, 14*b* is supported by mounting members 18*a*, 18*b* on a center flange 18 and clamps or mounts 16*a*, 16*b* attached to respective lateral sides of the curved walls 10*b* of the monocoque shell 10. Each sleep system 14*a*, 14*b* is suspended substantially horizontally by its sides over a space 15*a*, 15*b*. Space 15*a*, 15*b* underneath the sleep system can be used to stow luggage and other gear 17 for the crew. A divider 19 may be arranged between the two sleep areas 14*a*, 14*b* for privacy. Personal convenience units 25*a*, 25*b* may also be supported on an upper mounting for the divider wall, and may house personal air outlets, reading lights, etc. The bottom floor portion of the curved walls 10*b* of the monocoque shell 10 can have a curved, finished outer surface that forms part of the ceiling of the passenger compartment (described below with respect to FIGS. 5A and 5B). As shown in FIG. 3, the bottom floor portion of the curved walls 10*b* of the monocoque shell 10 can be supported on lateral ceiling frames 26*a*, 26*b*.

Figure 4:
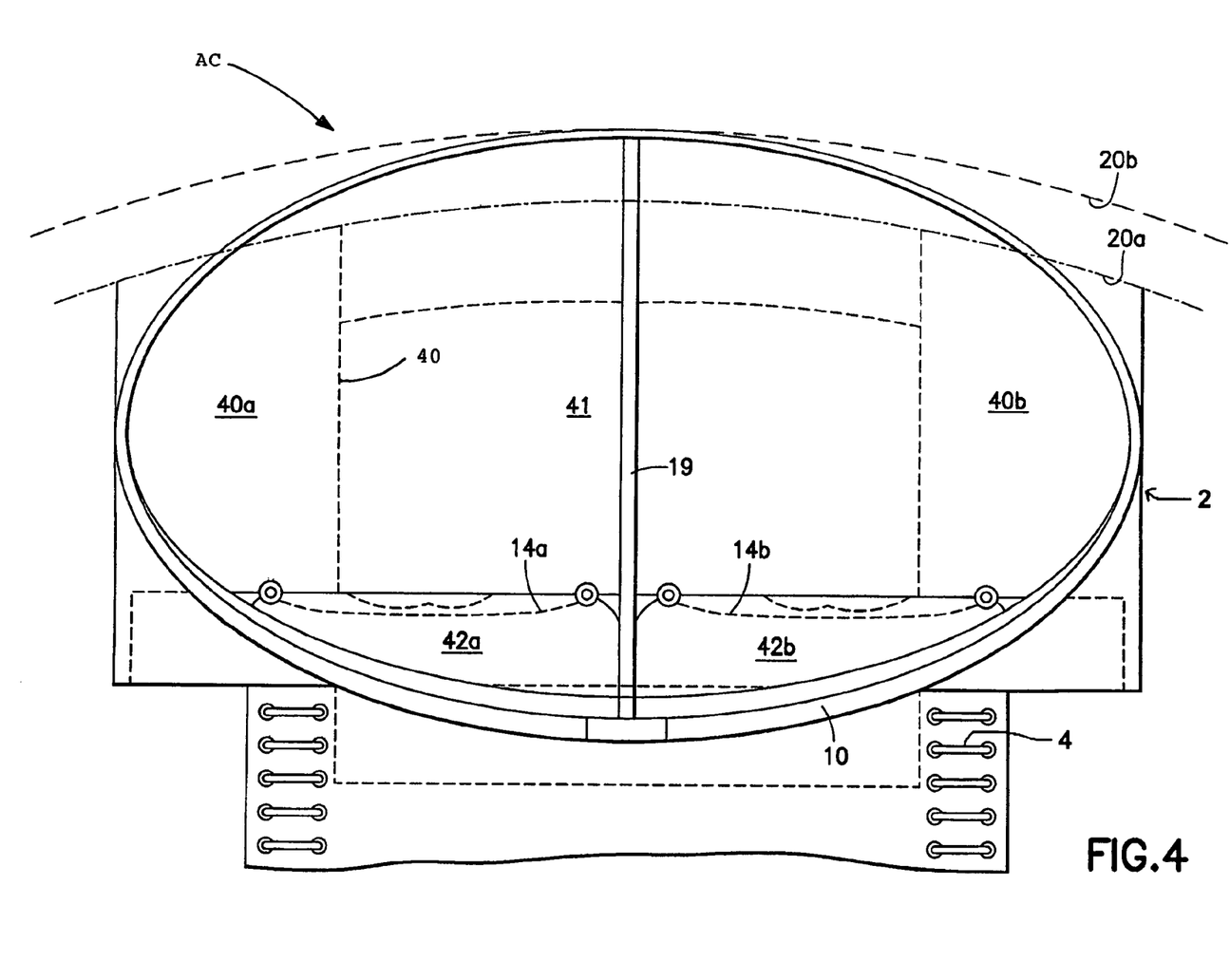
FIG. 4 compares the crew rest unit of monocoque construction in the overhead crown space as compared to a conventional crew rest unit

Referring to FIG. 4, the monocoque shell 10 for the overhead crew rest module 2 is shown tucked in position within the aircraft skin or interior wall 20*a*, 20*b* (shown in solid lines) in comparison to the shape of a conventional crew rest module 40 (shown in dashed lines). In this figure, the dotted-and-dashed line indicates the more forward skin or wall structure 20*a* defining the interior skin of a aircraft crown volume located toward the cockpit, whereas the dashed line indicates the more rearward skin or wall structure 20*b* having a greater height at a more rearward part of the aircraft AC.

The conventional crew rest module 40 typically has left and right side bunk areas 40a, 40b connecting to a center transition space 41 by which the crew enters the rest module 2. The conventional bunk areas 40a, 40b have mattresses 42a, 42b spanning the bunk areas 40a, 40b and the transition area 41. The conventional crew rest module 40 may be assembled from component panels, fittings, fasteners and an array of attachment or fastener mountings to the aircraft frame, making it relatively heavy in weight and laborious to install.

By comparison, the monocoque shell 10 of the crew rest module 2 in the present disclosure is a single-component light-weight structure and is also the load-bearing structure for attachment to the aircraft. The tension-supported sleep systems 14a, 14b that may be used in the monocoque shell 10 are also very lightweight and replace the need for heavy, bulky mattresses.

Figure 5A:
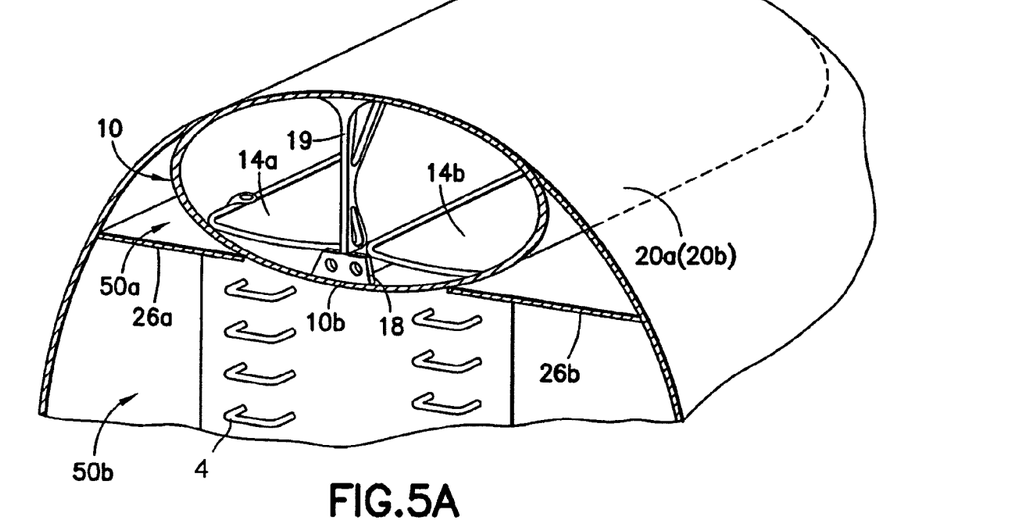
FIGS. 5A and 5B show the monocoque shell for the crew rest unit installed in the overhead crown volume space with its bottom floor portion used to form part of the ceiling of the main passenger compartment.
Figure 5B:
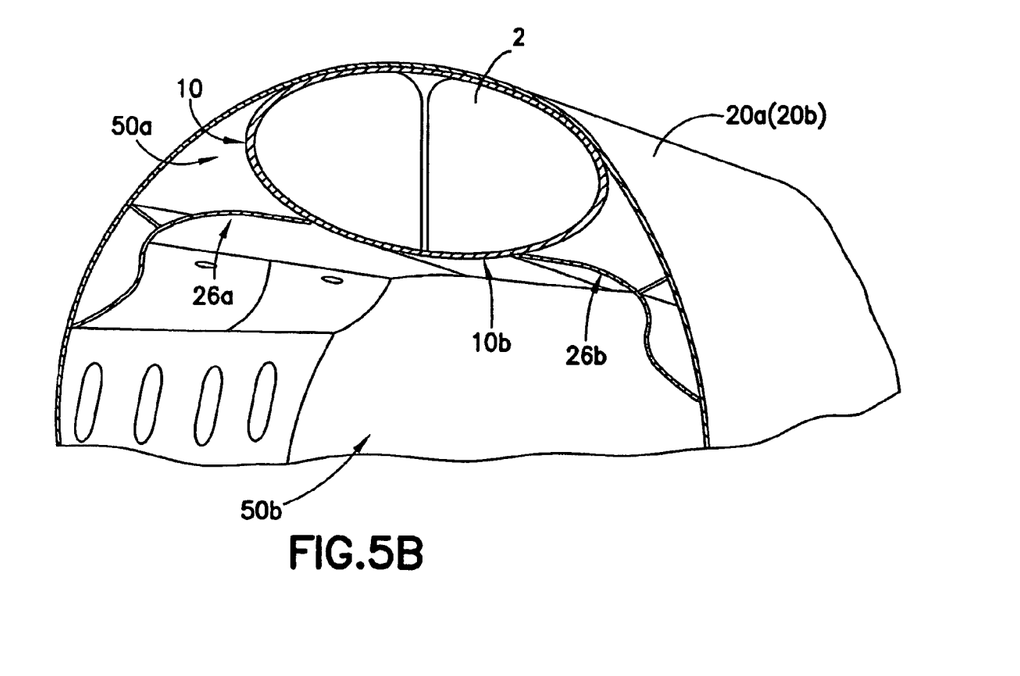

In FIGS. 5A and 5B, the monocoque shell 10 that may be used for a crew rest module 2 is shown installed in an overhead crown volume space 50a with its bottom floor portion 10b supported on lateral ceiling frames 26a, 26b so as to form the ceiling of the main passenger compartment 50b.

Alternatively, the monocoque shell 10 may be attached to the aircraft skin and/or interior wall structure with a tension connection such as, without limitation, cables forming a truss. This arrangement may be lighter than tie rods but may require more cables to apply multi-directional holding forces. A similar installation procedure may be used for other rest modules 2 that may be installed elsewhere in the crown volume space. Once the monocoque shell(s) 10 of the crew rest module(s) 2 are installed, then the other passenger compartment walls, floor, bulkheads and ceiling parts can be installed around them. In this manner, the rest modules 2 can be installed in a single initial installation step, thereby avoiding the need for laborious assembly of panels, fasteners, and fittings as would otherwise be used for a conventional assembly.

In a particularly preferred embodiment, tension-supported sleep systems 14a, 14b may have a very lightweight, non-bulky construction. Current sleeping systems in overhead crew and attendant rests may consist of a hard flat surface on which a mattress is placed. These may be relatively heavy for the function that they are intended to perform. This weight may be supported with strong fittings, thereby adding to the weight of the aircraft and reducing its fuel efficiency.

Figure 6:
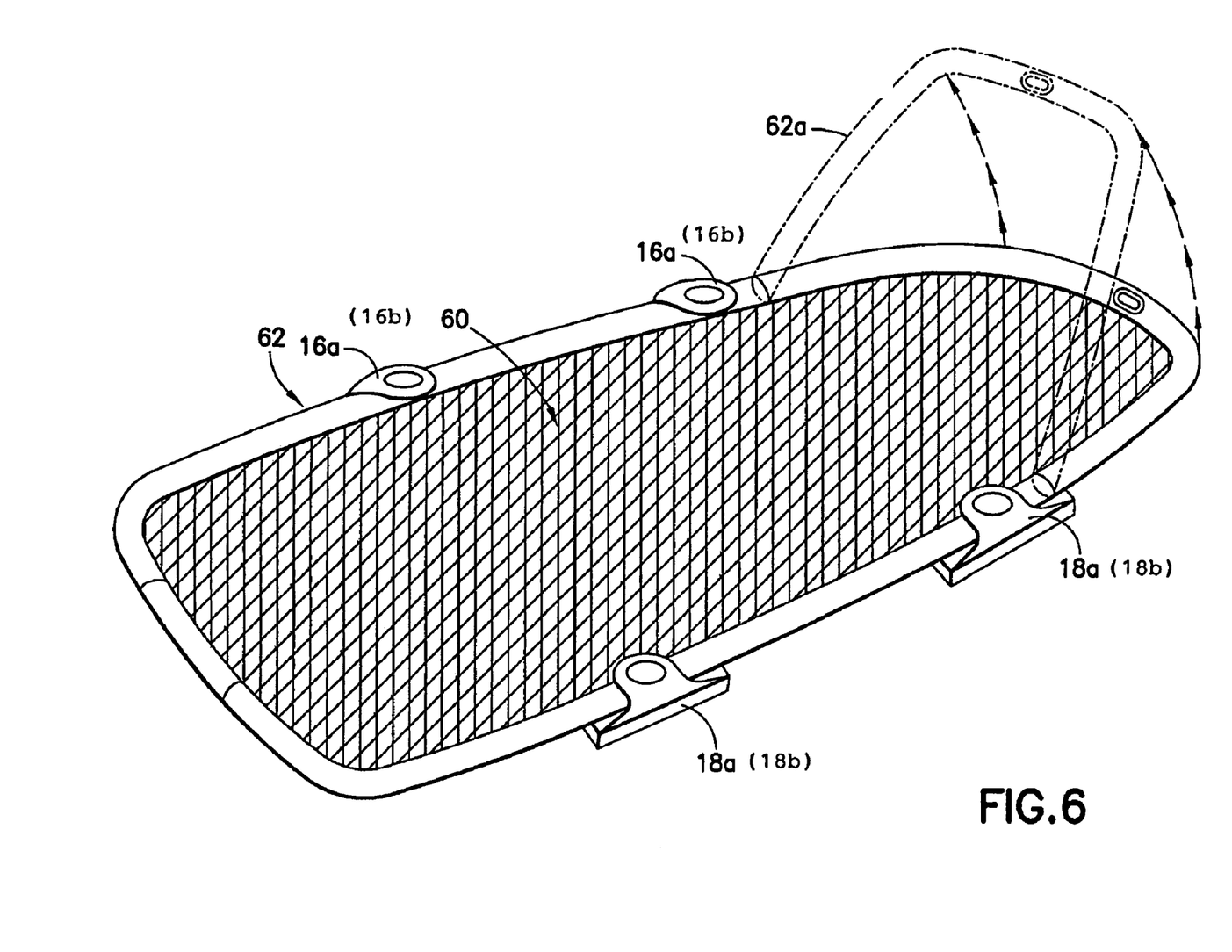
FIG. 6 illustrates a preferred embodiment of a tension-supported sleeping system for use in the monocoque crew rest unit.

Referring to FIG. 6, a preferred embodiment of a tension-supported sleeping system is formed by a fabric or synthetic mesh material 60 stretched over a frame 62 to form a surface for the sleep system 14a, 14b. The frame 62 may be supported on each lateral side by two or more clamps or mounts 16a (16b) and 18a (18b) on the monocoque shell floor portion 10b and center flange 18 (see FIG. 3). The frame 62 can be built out of a strong lightweight material such as, without limitation, a metallic, metallic/composite, and/or composite material (e.g. glass, Kevlar, carbon fiber, and/or graphite reinforced, etc). Alternatively, the frame 62 could be built into the monocoque shell floor portion 10b and center flange 18. The material properties of the fabric or mesh 60 and the amount of tension stretching it on the frame 62 are chosen to allow for a comfortable deflection when the weight of a person is lying down on the tension-supported fabric or mesh material 60. The frame 62 may also be made flexible so as to deflect under loading to add to user comfort. A portion 62a of the frame 62 can be made pivotable to allow lifting (in the direction of the arrows in the figures) to open an access way to a space underneath the sleep system (see FIG. 3) which can be used to stow luggage and other gear for the crew. Other pivoting and stowage arrangements may also be designed within the contemplation of those skilled in the art.

The lighter weight, tension-supported sleeping system 14a, 14b formed with fabric or mesh material 62 stretched on frame 60 contributes to a lower, overall weight for the rest module 2. The light-weight fabric or mesh can support an average person with comfort by allowing better air circulation around the body than when using a more conventional mattress. The need for heavy-duty supports and fittings for the sleep systems is obviated and significant weight reduction may be obtained using the tension-supported sleep system of this design. Greater air circulation around the user due to the light-weight fabric or mesh forming the sleep surface would result in an added level of comfort for the person lying on the surface. The possibility for storage of items underneath the sleeping system enables optimal utilization of available space without the needed for any added structure or component weight.

FIG. 7 is a schematic view of an aircraft showing an example of a monocoque shell 10 for a crew rest unit installed adjacent a cockpit (labeled Cockpit) in a crown space (labeled Overhead Crown Space) of the fuselage FF of an aircraft AC. For safety, access to the monocoque shell 10 of the crew rest module 2 may be provided for the flight crew by a ladder 4 within or adjacent the cockpit (see FIG. 5A). In similar installations, the monocoque shell 10 may be used for other crew rest modules 2 installed elsewhere in the crown volume (labeled Overhead Crown Space) of the fuselage FF for other crew and flight attendants.

Figure 8:
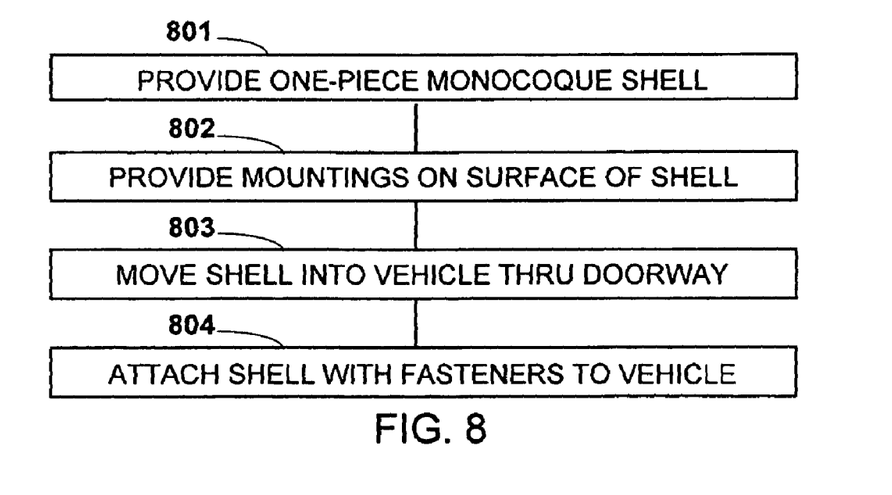
FIG. 8 is a flow diagram of a method for assembling a crew rest unit in a pre-determined installation space of a vehicle for long distance transport of passengers.

FIG. 8 is a flow diagram of a method for assembling a crew rest unit in a pre-determined installation space of a vehicle for long distance transport of passengers. The general method comprises in Step 801 providing a monocoque shell complementary to and fitting within the pre-determined installation space of the vehicle, the monocoque shell being formed as a single-piece load-bearing structure having a shape and being dimensioned such that it can be moved as a single-piece edgewise through a doorway into the vehicle, in Step 802 providing the monocoque shell with load-bearing mounting members on its outer surface, in Step 803 moving the monocoque shell as a single-piece edgewise through a doorway into the pre-determined installation space of the vehicle, and in Step 804 attaching the monocoque shell with fasteners attached between the mounting members and the aircraft which may include, without limitation, an adjacent wall or frame in the pre-determined installation space of the vehicle.

Figure 9:
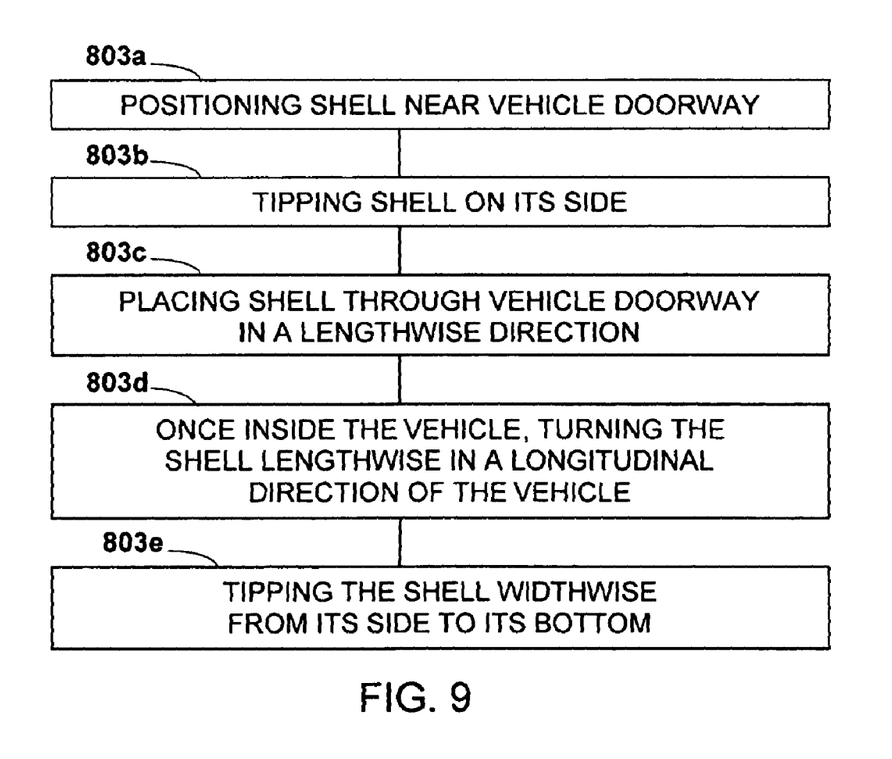
FIG. 9 is a flow diagram of a method for moving a crew rest unit into a vehicle for long distance transport of passengers.

In the disclosed example of a crew rest unit for installation in the overhead crown space of an aircraft, as shown in FIG. 7, the monocoque shell 10 can be installed at an early stage of airframe construction when the fuselage volume is open and the walls, floor, bulkheads and ceiling of the passenger compartment have not yet been installed. A typical size for the monocoque shell 10 for a two-person sleep unit can be up to about 84 inches long, up to about 78 inches wide, and up to about 42 inches high. Alternatively, the shell 10 can be formed as a single-piece monocoque construction 801 and positioned for installation into the fuselage through a doorway in the fuselage 803, as shown in FIGS. 8 and 9. In Step 803a, the shell 10 may be positioned near the vehicle doorway. In Step 803b, the shell may be tipped onto its side. In Step 803c, the shell may be placed through the vehicle doorway in a lengthwise direction. Once inside, it may then be turned lengthwise in a longitudinal direction LL of the fuselage, shown in Step 803d, and also turned widthwise WW in the fuselage to tip the shell from its side to its bottom. The shell 10 may then be secured by tie-rods or other fasteners into the available crown volume space of the fuselage 804.

The monocoque construction for an aircraft rest module 2 thus accomplishes the dual functions of supporting the sleep enclosure while also providing the load-bearing structure for installing it within the available space for the crew rest unit. The monocoque shell construction eliminates many of the typical bulky and heavy fasteners, brackets, and fittings used to fasten and support the panels of the conventional sleep enclosure. The tension-supported sleep systems obviate the need for heavy and bulky mattresses to be supported on inflexible panels, and also frees up usable space in which gear and other objects may be stored. The improved crew rest module 2 can be fabricated with much less weight, installed much easier and quicker, and utilizes the available space for installation much more efficiently.

The advantages of using a monocoque structure for the rest enclosure and light-weight sleep systems can be applied to a wide range of commercial aircrafts, military transports, naval transports (including submarines), and even on buses and trains. With the high cost of fuel, the benefit of every pound of weight reduction obtained per trip while providing the desired crew rest function is further multiplied by the number of trips taken over the lifetime of that mode of transport.

Many modifications and variations may of course be devised given the above description of the principles in this disclosure. It is intended that all such modifications and variations be considered as within the spirit and scope of this disclosure, as defined in the following claims.

The invention claimed is:

1. A crew rest unit for an aircraft, comprising:
a monocoque shell having curved walls complementary to and fitting within a space in the aircraft;
said curved walls having an outer surface;
said monocoque shell having a pair of sleep areas arranged side-by-side and a center flange centered horizontally within the walls of the monocoque shell, the center flange supporting a divider arranged between the pair of sleep areas, and a pair of tension-supported sleep systems in respective ones of the pair of sleep areas each having a frame supporting a tensioned mesh, the frame suspended substantially horizontally over a storage area defined between the frame and a lower portion of the curved walls of the monocoque shell, the tensioned mesh defining a sleeping surface, the frame having a movable portion for accessing the storage area;
said outer surface of said monocoque shell having at least one load-bearing mounting member; and
said at least one load-bearing mounting member is attached to the aircraft.

2. The crew rest unit of claim 1, wherein each tension-supported sleep system is supported between the curved walls and the center flange.

3. The crew rest unit of claim 2, wherein the center flange further comprises mounts supporting the pair of tension-supported sleep systems.

4. The crew rest unit of claim 1, wherein the frame of each of the pair of tension-supported sleep systems has a movable portion which is openable for accessing a respective storage area.

5. The crew rest unit of claim 1, wherein the space is within a crown volume space at an upper portion of the aircraft fuselage.

6. The crew rest unit of claim 1, wherein the monocoque shell is formed as a single-piece structure.

7. The crew rest unit of claim 6, wherein the said at least one load-bearing mounting member is attached to the aircraft with a tie rod.

8. The crew rest unit of claim 6, wherein the monocoque shell has an oval cross-sectional shape.

9. The crew rest unit of claim 6, wherein the monocoque shell is dimensioned in length, width, and height such that it can be moved as a single-piece edgewise through a doorway into the aircraft for installation.

10. A crew rest unit for a vehicle for long-distance transport of a plurality of passengers, comprising:
a monocoque shell having walls shaped complementary to and fitting within an installation space in the vehicle, said monocoque shell being formed as a single-piece structure and providing an enclosure for a pair of sleep areas arranged side-by-side, the monocoque shell comprising a central flange centered horizontally within the walls of the monocoque shell, each of the sleep areas being provided with a tension-supported sleep system having a frame supporting a tensioned mesh that defines a sleeping surface, each tension-supported sleep system supported between a respective lateral side of the walls of the monocoque shell and a respective part of the central flange; and
said walls of said monocoque shell having load-bearing mounting members on their outer surfaces for attachment of fasteners to an adjacent wall or frame for the installation space.

11. The crew rest unit of claim 10, further comprising a pair of storage areas in respective spaces below the respective tension-supported sleep systems.

12. The crew rest unit of claim 10, wherein the monocoque shell is formed as a single-piece structure having an oval cross-sectional shape and dimensioned in length, width, and height such that it can be moved as a single-piece edgewise through a doorway into the vehicle for long-distance transport of passengers.

13. The crew rest unit of claim 10, wherein the monocoque shell is made of metallic, metallic/composite, and/or composite material of sufficient strength and stiffness to serve as a crew rest structure and as a load-bearing structure for installation in the vehicle for long-distance transport of passengers.

14. A method of assembling a crew rest unit in an installation space of a vehicle for long-distance transport of a plurality of passengers, comprising:
providing a monocoque shell having walls shaped complementary to and fitting within the installation space, said monocoque shell being formed as a single-piece structure and providing an enclosure for a pair of sleep areas arranged side-by-side, the monocoque shell comprising a center flange centered horizontally within the walls of the monocoque shell, and each of said sleep areas being provided with a tension-supported sleep system having a frame supporting a tensioned mesh that defines a sleeping surface, each tension-supported sleep system supported between a respective lateral side of the walls of the monocoque shell and a respective part of the center flange;
providing said walls of said monocoque shell with load-bearing mounting members on their outer surfaces,
moving said monocoque shell as a single-piece through a doorway into the installation space,
attaching said monocoque shell with fasteners to an adjacent wall or frame for the installation space.

15. A crew rest unit for an aircraft, comprising:
a monocoque shell having curved walls complementary to and fitting within a space in the aircraft;
said curved walls having an outer surface;
said monocoque shell having a pair of sleep areas therein, each of the sleep areas comprising a frame supporting a tensioned mesh that defines a sleeping surface, and a center flange centered horizontally within the walls of the monocoque shell and supporting a divider arranged between the pair of sleeping areas;

said outer surface having at least one load-bearing mounting member; and said at least one load-bearing mounting member is attached to the aircraft.

16. The crew rest unit of claim 15, further comprising storage areas defined between the frame of each of the sleeping areas and a lower portion of the curved walls, the frame having a movable portion which is openable for accessing the storage areas.

* * * * *